United States Patent

Ito et al.

Patent Number: 5,086,151
Date of Patent: Feb. 4, 1992

[54] MOISTURE-CURING SEALANT COMPOSITION

[75] Inventors: Masahiro Ito, Osaka; Yukio Hayashi, Kyoto, both of Japan

[73] Assignee: Sunstar Giken Kabushiki Kaisha, Osaka, Japan

[21] Appl. No.: 528,616

[22] Filed: May 25, 1990

[30] Foreign Application Priority Data

May 25, 1989 [JP] Japan .................................. 1-131831

[51] Int. Cl.$^5$ .............................................. C08G 18/16
[52] U.S. Cl. ...................................................... 528/53
[58] Field of Search ........................................... 528/53

[56] References Cited

U.S. PATENT DOCUMENTS 4,705,840 11/1987 Buckanin .............................. 528/53

Primary Examiner—Maurice J. Welsh
Assistant Examiner—Rachel Johnson
Attorney, Agent, or Firm—Wegner, Cantor, Mueller & Player

[57] ABSTRACT

A moisture-curing sealant composition which comprises a urethane prepolymer containing free NCO group as a main component and di[2-(3,5-dimethylmorpholino)ethyl] ether of the formula:

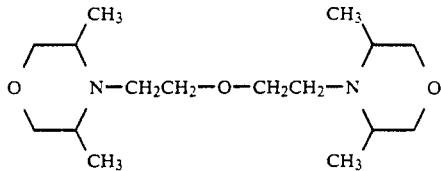

as a curing catalyst, said curing catalyst being incorporated in an amount of 0.2 to 2% by weight based on the whole amount of the moisture-curing sealant composition. The moisture-curing sealant composition shows an excellent storage stability and curability both at ordinary and lower temperature.

5 Claims, No Drawings

MOISTURE-CURING SEALANT COMPOSITION

The present invention relates to a moisture-curing sealant composition, more particularly, to a one-part moisture-curing sealant composition containing a specific curing catalyst. The moisture-curing sealant composition of the present invention shows a good storage stability under moisture-free conditions (e.g. at 40° C. for 1 to 3 months) and excellent curability at a lower temperature.

PRIOR ART

A well known one-part (one-pack) moisture-curing sealant composition is a composition comprising as a main component a urethane prepolymer containing free NCO group and it is suitably used for adhesion of parts, window glass, or doors in a manufacturing process of automobiles. This type sealant composition is curable in the presence of moisture in the air. However, a sealant composition having a higher curing rate has been desired in order to improve labor efficiency at the field of work, and hence, the above type sealant composition is usually incorporated with a curing catalyst. In this case, the sealant composition with the curing catalyst incorporated should also show a sufficient storage stability under moisture-free conditions.

The conventional catalyst used in the sealant composition includes, for example, a metallic catalyst, an amine catalyst and the like. However, these catalysts are disadvantageous in that some of them show poor storage stability and others are insufficient in curability at an ordinary temperature or at a lower temperature such as at 5° C.

Recently, a new catalyst has been developed which is dimorpholinodiethyl ether of the formula:

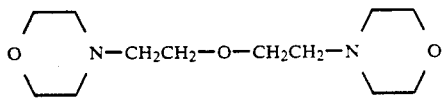

(cf. Japanese Patent First Publication No. 120721/1988). This catalyst shows sufficient storage stability and curability at an ordinary temperature but is not effective in curability at a lower temperature.

SUMMARY DESCRIPTION OF THE INVENTION

Under the circumstances, the present inventors have studied as to development of an improved catalyst having an excellent curability at a lower temperature, and as a result, have found that a methyl-substituted derivative of the above dimorpholinodiethyl ether shows an excellent storage stability and curability both at an ordinary temperature and at a lower temperature when used at a specific amount.

An object of the present invention is to provide a moisture-curing sealant composition which shows an excellent storage stability and curability both at an ordinary temperature and at a lower temperature. These and other objects and advantages of the invention will be apparent to those skilled in the art from the following description.

DETAILED DESCRIPTION OF THE INVENTION

The present invention relates to a moisture-curing sealant composition which comprises a urethane prepolymer containing free NCO group as a main component and di[2-(3,5-dimethylmorpholino)ethyl] ether of the formula (I):

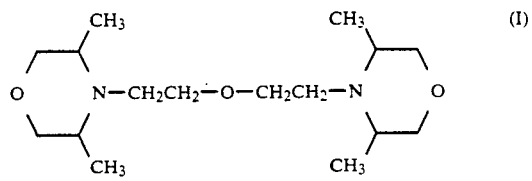

as a curing catalyst wherein said curing catalyst being incorporated in an amount of 0.2 to 2% by weight based on the whole amount of the moisture-curing sealant composition.

The urethane prepolymer having free NCO group used in the sealant composition of the present invention as a main component may be any prepolymer which is usually used in this kind of the sealing material as a main component. Examples of the prepolymer are a reaction product of a polyoxyalkylenepolyol such as polyoxyalkylenediol (e.g. polyoxyethylene glycol, polyoxypropylene glycol, polyoxybutyrene glycol or copolymer thereof) and a polyoxyalkylenetriol (e.g. an addition polymerization product of ethyleneoxide, propyleneoxide, butyreneoxide, etc. with glycerol, trimethylolpropane, etc.) with an excess amount of an organic diisocyanate compound (e.g. an aliphatic, alicylic, arylaliphatic or aromatic diisocyanate, etc.) in the usual manner. The reaction is carried out in an innert gaseous atmosphere optionally in the presence of a reaction catalyst (e.g. dibutyl tin dilaurate, dibutyl tin maleate, tin(II) octate, lead octenoate, etc.) at a temperature ranging from 50° to 120° C., preferably from 60° to 90° C.

Among the above-mentioned urethane prepolymers, a urethane prepolymer having 1.5 to 3 w/w % of free NCO group is preferable. This urethane prepolymer is prepared by reacting a polyoxypropylene glycol of a molecular weight of 3000 to 7000 with an aromatic diisocyanate compound such as 2,4- and/or 2,6-tolylenediisocyanate (hereinafter referred to as "TDI"), diphenylmethane-4,4'-diisocyanate (hereinafter referred to as "MDI"), 1,5-naphthalenediisocyanate, xylylenediisocyanate, etc.

The moisture-curing sealant composition of the present invention comprises the above-mentioned urethane prepolymer as the main component and the curing catalyst of the above formula (I). The sealant composition of the present invention may further optionally comprise a filler (e.g. carbon black, calcium carbonate, clay, talc, etc.), a plasticizer (e.g. dioctyl phthalate, butylbenzyl phthalate, dinonyl phthalate, diethylene glycol dibenzoate, ethylene glycol monobutyl ether benzoate, partially hydrogenated terphenyl, alkyl polycyclic aromatic hydrocarbons, chlorinated paraffins, etc.), a solvent (e.g. toluene, xylene, esters such as ethyl acetate or butyl acetate, ketones such as acetone, methyl ethyl ketone, or methyl isobutyl ketone, ethers such as diethyl ether, methyl ethyl ether, or diisopropyl ether, etc.) and the like in a suitable amount. All of the above optional components (such as the filler, the plasticizer and the solvent) should be inactive to NCO group.

The amount of the urethane prepolymer in the present sealant composition is 20 to 60% by weight, preferably 30 to 50% by weight, based on the whole weight of the composition.

The amount of the curing catalyst (I) used in the sealant composition is 0.2 to 2% by weight, preferably 0.4 to 1.0% by weight, based on the whole amount of the sealant composition of the present invention. When the amount is less than 0.2% by weight, the desired curing effect is not obtained, and when the amount is over 2% by weight, the storage stability of the composition is deteriorated. If necessary, the curing catalyst (I) may be used in combination with the conventional metallic catalyst or amine catalyst or with a catalyst of imidazole compounds in the sealant composition of the present invention.

The present invention is illustrated by means of the following non-limitative Examples and Comparative Examples.

EXAMPLE 1 AND COMPARATIVE EXAMPLES 1 TO 7

(1) Preparation of Urethane Prepolymer

To polyoxypropylene glycol having a molecular weight of 7000 (3000 g) was added MDI (350 g) and the mixture was reacted in nitrogen atmosphere at 80° C. for 3 hours to give a urethane prepolymer having free NCO group at a content of 2.3 w/w % and viscosity of 38000 cps (at 20° C.).

(2) Preparation of Sealing Material

To the urethane prepolymer (500 g) prepared in the above procedure (1) were added dry calcium carbonate (200 g) and carbon black (600 g) and the mixture was stirred for 10 minutes. Thereafter dioctyl phthalate (250 g) was added thereto and the mixture was stirred with degasing under vacuum condition for 15 minutes. To the mixture were then added a solvent (toluene) (80 g) for regulating the viscosity of the composition and each 8 g (0.5% by weight based on the whole amount of the sealant composition) of a variety of curing catalysts listed in Table 1 and the mixture was stirred with degasing for 10 minutes.

(3) Test for Curing Characteristics at Ordinary and Lower Temperatures

Each of the sealant compositions prepared in the procedure (2) was cured for 1 hour, 3 hours or 5 hours under condition of 5° C./50% RH or 20° C./65% RH and then a shear strength (kg/cm²) was measured for each cured sealant composition. The results are shown in Table 1.

TABLE 1

| Curing Catalyst* | Curing Condition | | | | | |
|---|---|---|---|---|---|---|
| | 5° C./50% RH | | | 20° C./65% RH | | |
| | 1 h | 3 hs | 5 hs | 1 h | 3 hs | 5 hs |
| Example 1 | 1.4 | 3.8 | 6.2 | 2.4 | 6.8 | 8.9 |
| Comp. Ex. 1 | 0.7 | 1.3 | 3.5 | 1.9 | 6.8 | 8.1 |
| Comp. Ex. 2 | 0.2 | 0.4 | 0.8 | 0.5 | 4.8 | 8.6 |
| Comp. Ex. 3 | 0.2 | 0.5 | 0.9 | 0.5 | 3.1 | 6.8 |
| Comp. Ex. 4 | 0.3 | 0.4 | 0.5 | 0.5 | 2.2 | 4.1 |
| Comp. Ex. 5 | 0.3 | 0.5 | 0.7 | 0.7 | 2.5 | 6.3 |
| Comp. Ex. 6 | 0.3 | 0.5 | 0.8 | 0.5 | 1.8 | 3.3 |

TABLE 1-continued

| Curing Catalyst* | Curing Condition | | | | | |
|---|---|---|---|---|---|---|
| | 5° C./50% RH | | | 20° C./65% RH | | |
| | 1 h | 3 hs | 5 hs | 1 h | 3 hs | 5 hs |
| Example 1 | 1.4 | 3.8 | 6.2 | 2.4 | 6.8 | 8.9 |
| Comp. Ex. 7 | 0.5 | 0.6 | 0.7 | 0.7 | 2.3 | 3.9 |

(Note)
*The curing catalysts used in each of Example and Comparative Examples are as follows:

Example 1:

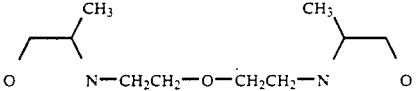

Comparative Example 1:

Comparative Example 2: Dibutyl tin dilaurate
Comparative Example 3: Dibutyl tin maleate
Comparative Example 4: Lead octenate
Comparative Example 5: Tin octenate
Comparative Example 6: Triethylamine
Comparative Example 7: N-Methylmorpholine (4) Test for Storage Stability After storing the sealant compositions under sealed condition at 40° C. for 1 month, 2 months or 3 months, each of the sealant compositions were observed for their status using the criteria as follows:

⊚ : Less than 20% of increase of viscosity
○ : Less than 40% of increase of viscosity
△ : Less than 60% of increase of viscosity
x : More than 60% of increase of viscosity or gellation occurred The results are shown in Table 2.

TABLE 2

| Curing Catalyst* | Stored at 40° C. | | |
|---|---|---|---|
| | 1 Month | 2 Months | 3 Months |
| Example 1 | ⊚ | ⊚ | ○ |
| Comp. Ex. 1 | ⊚ | ⊚ | ○ |
| Comp. Ex. 2 | ⊚ | ⊚ | ○ |
| Comp. Ex. 3 | ⊚ | ⊚ | ○ |
| Comp. Ex. 4 | ⊚ | ⊚ | ⊚ |
| Comp. Ex. 5 | ⊚ | ⊚ | ⊚ |
| Comp. Ex. 6 | ○ | △ | x |
| Comp. Ex. 7 | ○ | △ | △ |

Note:
*The curing catalysts used in each of Example and Comparative Examples are the same as in Table 1.

In addition, the test for curing characteristics at a lower temperature and the test for storage stability were also conducted on the sealant composition of Example 1 with various amounts of the curing catalyst ranging from 0.1 to 2.5% by weight. The results are shown in Table 3.

TABLE 3

| Catalyst content (% by weight) | Test for curing characteristics at a lower temp. | Storage stability |
|---|---|---|
| 0.1 | x | ⊚ |
| 0.2 | ○ | ⊚ |
| 0.5 | ⊚ | ⊚ |
| 1.0 | ⊚ | ⊚ |
| 2.0 | ⊚ | ○ |
| 2.5 | ⊚ | x |

What is claimed is:

1. A moisture-curing sealant composition which comprises a urethane prepolymer containing free NCO group as a main component and di[2-(3,5-dimethylmorpholino)ethyl] ether of the formula:

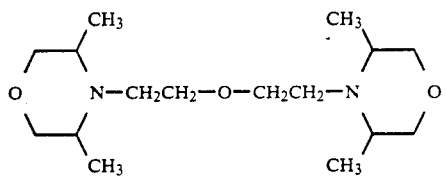

as a curing catalyst, said curing catalyst being incorporated in an amount of 0.2 to 2% by weight based on the whole amount of the moisture-curing sealant composition.

2. The composition according to claim 1, wherein said urethane prepolymer is a reaction product of a polyoxyalkylenepolyol of a molecular weight of 3000 to 7000 and an aromatic diisocyanate and contains the free NCO group in the range of 1.5 to 3 w/w %.

3. The composition according to claim 1, which further comprises conventional filler, plasticizer and solvent.

4. The composition according to claim 1, wherein the curing catalyst is in an amount of 0.4 to 1.0% by weight based on the whole weight of the composition.

5. The composition according to claim 2, wherein the aromatic diisocyanate is a member selected from the group consisting of 2,4- and/or 2,6-tolylenediisocyanate, diphenylmethane-4,4'-diisocyanate, 1,5-naphthalenediisocyanate and xylylenediisocyanate.

* * * * *